(12) United States Patent
Ricket

(10) Patent No.: US 9,799,018 B2
(45) Date of Patent: Oct. 24, 2017

(54) SYSTEMS AND METHODS FOR ACTIVATION AND DEACTIVATION OF APPLIANCES

(71) Applicant: d.light design, Inc., San Francisco, CA (US)

(72) Inventor: Douglas J. Ricket, Saratoga, CA (US)

(73) Assignee: D.Light Design, Inc., San Francisco, CA (US)

(*) Notice: Subject to any disclaimer, the term of this patent is extended or adjusted under 35 U.S.C. 154(b) by 99 days.

(21) Appl. No.: 14/663,302

(22) Filed: Mar. 19, 2015

(65) Prior Publication Data

US 2016/0041591 A1 Feb. 11, 2016

Related U.S. Application Data

(63) Continuation of application No. 13/741,218, filed on Jan. 14, 2013, now Pat. No. 9,020,852, which is a
(Continued)

(51) Int. Cl.
*G06F 1/26* (2006.01)
*G05B 11/01* (2006.01)
(Continued)

(52) U.S. Cl.
CPC ............ *G06Q 20/145* (2013.01); *G05B 11/01* (2013.01); *G06F 1/26* (2013.01); *G06F 21/44* (2013.01);
(Continued)

(58) Field of Classification Search
CPC ............ G06Q 20/145; G06Q 20/38215; G06F 21/44; G06F 1/26; H04L 9/3247; H04L 2209/56; G05B 11/01
See application file for complete search history.

(56) References Cited

U.S. PATENT DOCUMENTS

D287,006 S 12/1986 Fletcher et al.
D291,926 S 9/1987 Schlepp
(Continued)

FOREIGN PATENT DOCUMENTS

CN 101534592 A 9/2009
CN 201465222 U 12/2010
(Continued)

OTHER PUBLICATIONS

Anas et al. (Aug. 2012) "Minimizing Electricity theft using Smart Meters in AMI" arXiv:1208.2321v1 [cs.NI] Aug. 11, 2012.
(Continued)

*Primary Examiner* — Ramesh Patel
(74) *Attorney, Agent, or Firm* — Morgan, Lewis & Bockius LLP

(57) ABSTRACT

Systems and methods are provided for an appliance system. The system includes an appliance, and a processor connected to the appliance such that the processor places the appliance in one of an enabled state and a disabled state. The processor is configured to track usage of the appliance and to place the appliance in a disabled state when the usage of the appliance exceeds a threshold amount. The system also includes a data receiving device configured to receive a code, wherein upon receipt of a valid code, the processor is configured to adjust the threshold amount to allow additional usage of the appliance.

22 Claims, 6 Drawing Sheets

Related U.S. Application Data continuation of application No. 13/042,611, filed on Mar. 8, 2011, now Pat. No. 8,355,805.

(51) Int. Cl.
*G06Q 20/14* (2012.01)
*G06F 21/44* (2013.01)
*G06Q 20/38* (2012.01)
*H04L 9/32* (2006.01)

(52) U.S. Cl.
CPC ..... *G06Q 20/38215* (2013.01); *H04L 9/3247* (2013.01); *H04L 2209/56* (2013.01)

(56) References Cited

U.S. PATENT DOCUMENTS

| | | | |
|---|---|---|---|
| D292,321 S | 10/1987 | Liu | |
| D298,469 S | 11/1988 | Melrose | |
| 4,788,714 A | 11/1988 | Hashimoto | |
| 4,885,766 A | 12/1989 | Yasuoka et al. | |
| D306,583 S | 3/1990 | Krolopp et al. | |
| 4,926,325 A | 5/1990 | Benton et al. | |
| D309,787 S | 8/1990 | Chien | |
| 5,221,838 A | 6/1993 | Gutman et al. | |
| D337,644 S | 7/1993 | Stearns et al. | |
| D339,808 S | 9/1993 | Khoo et al. | |
| 5,535,910 A | 7/1996 | Cassel | |
| 5,555,551 A | 9/1996 | Rudokas et al. | |
| D391,921 S | 3/1998 | Zimmer et al. | |
| 5,724,525 A * | 3/1998 | Beyers, II | G06Q 20/102 348/E7.063 |
| 5,848,054 A | 12/1998 | Mosebrook et al. | |
| 5,887,266 A | 3/1999 | Heinonen et al. | |
| 5,892,900 A * | 4/1999 | Ginter | G06F 21/10 726/26 |
| D411,206 S | 6/1999 | Richter | |
| 5,943,423 A | 8/1999 | Muftic | |
| D417,922 S | 12/1999 | Mulder et al. | |
| D422,725 S | 4/2000 | Leonard | |
| 6,078,806 A | 6/2000 | Heinonen et al. | |
| 6,086,216 A | 7/2000 | Goldfarb | |
| D430,332 S | 8/2000 | Hsieh | |
| 6,158,227 A * | 12/2000 | Seeley | G01K 1/14 340/585 |
| 6,179,437 B1 | 1/2001 | Hardy et al. | |
| D443,383 S | 6/2001 | Shih | |
| D452,022 S | 12/2001 | Osiecki et al. | |
| 6,349,314 B1 | 2/2002 | Patel | |
| 6,529,725 B1 | 3/2003 | Joao et al. | |
| 6,535,726 B1 | 3/2003 | Johnson | |
| 6,597,776 B1 * | 7/2003 | Walker | G06Q 20/123 379/114.25 |
| D479,191 S | 9/2003 | Peress et al. | |
| 6,618,772 B1 | 9/2003 | Kao et al. | |
| 6,745,106 B2 | 6/2004 | Howard et al. | |
| D492,806 S | 7/2004 | Hsu et al. | |
| 6,807,548 B1 * | 10/2004 | Kemper | G06F 8/72 |
| D501,573 S | 2/2005 | Benensohn | |
| D509,921 S | 9/2005 | Lam | |
| 6,950,867 B1 * | 9/2005 | Strohwig | G06F 21/10 709/223 |
| D519,658 S | 4/2006 | Izardel | |
| 7,035,719 B2 | 4/2006 | Howard et al. | |
| 7,098,772 B2 | 8/2006 | Cohen | |
| 7,123,752 B2 * | 10/2006 | Kato | G06K 9/00 382/115 |
| D532,142 S | 11/2006 | Matsui et al. | |
| 7,139,559 B2 | 11/2006 | Kenagy et al. | |
| D535,613 S | 1/2007 | Varalo et al. | |
| D546,488 S | 7/2007 | Poon | |
| D549,386 S | 8/2007 | Zuloff | |
| D559,174 S | 1/2008 | Sharma et al. | |
| D559,418 S | 1/2008 | Poon | |
| D567,417 S | 4/2008 | Wu et al. | |
| 7,362,213 B2 * | 4/2008 | Cohen | G08C 17/02 340/3.1 |
| D574,769 S | 8/2008 | Fisher et al. | |
| 7,418,088 B2 * | 8/2008 | Host | H04L 12/6418 370/352 |
| D576,753 S | 9/2008 | Mukai | |
| D578,960 S | 10/2008 | Fisher et al. | |
| D578,961 S | 10/2008 | Fisher et al. | |
| D586,736 S | 2/2009 | Fowler | |
| 7,602,673 B2 * | 10/2009 | Jung | G04C 9/00 340/309.6 |
| D606,685 S | 12/2009 | Holsinger | |
| D608,921 S | 1/2010 | DeBrunner | |
| D609,851 S | 2/2010 | Choi | |
| D611,898 S | 3/2010 | Yang | |
| D611,899 S | 3/2010 | Yang | |
| D611,900 S | 3/2010 | Yang | |
| 7,697,492 B2 | 4/2010 | Petite | |
| 7,702,501 B2 * | 4/2010 | Turner | G06F 17/27 704/10 |
| D617,265 S | 6/2010 | Sasada et al. | |
| D620,431 S | 7/2010 | Sasada et al. | |
| D621,541 S | 8/2010 | Hamel | |
| D628,534 S | 12/2010 | Daniel | |
| 7,898,261 B2 | 3/2011 | Tozun et al. | |
| 8,046,841 B2 | 10/2011 | Moskowitz et al. | |
| 8,077,016 B2 * | 12/2011 | Cohen | G08C 17/02 340/309.16 |
| 8,280,790 B2 | 10/2012 | Lappas et al. | |
| 8,311,521 B1 | 11/2012 | Paczkowski et al. | |
| 8,355,805 B2 * | 1/2013 | Ricket | G06F 1/26 700/19 |
| 8,489,481 B2 | 7/2013 | Moore et al. | |
| 8,543,505 B2 | 9/2013 | Pederson | |
| 8,676,711 B2 * | 3/2014 | Gupte | G06Q 20/123 705/50 |
| 8,737,954 B2 * | 5/2014 | Salonen | G06Q 10/02 455/406 |
| 8,785,773 B1 | 7/2014 | Lanni | |
| 9,578,182 B2 * | 2/2017 | Raleigh | H04M 15/723 |
| 2002/0069166 A1 * | 6/2002 | Moreau | G06Q 20/02 705/40 |
| 2002/0120569 A1 | 8/2002 | Day | |
| 2002/0128932 A1 | 9/2002 | Yung et al. | |
| 2002/0194468 A1 | 12/2002 | Betts-LaCroix et al. | |
| 2003/0045968 A1 | 3/2003 | Howard et al. | |
| 2004/0065731 A1 | 4/2004 | Vesterling | |
| 2004/0067746 A1 | 4/2004 | Johnson | |
| 2004/0078340 A1 * | 4/2004 | Evans | G06Q 20/10 705/64 |
| 2004/0176978 A1 | 9/2004 | Simon et al. | |
| 2004/0199299 A1 | 10/2004 | Howard et al. | |
| 2004/0243477 A1 * | 12/2004 | Mathai | G06Q 20/04 705/26.8 |
| 2005/0071264 A1 | 3/2005 | Tsoa-Lee et al. | |
| 2005/0131810 A1 | 6/2005 | Garrett | |
| 2006/0031180 A1 | 2/2006 | Tamarkin et al. | |
| 2006/0108417 A1 | 5/2006 | Simon et al. | |
| 2006/0136544 A1 | 6/2006 | Atsmon et al. | |
| 2006/0240890 A1 | 10/2006 | Walker et al. | |
| 2006/0267543 A1 | 11/2006 | O'Donoghue | |
| 2006/0274520 A1 | 12/2006 | Dalton et al. | |
| 2007/0053365 A1 | 3/2007 | Choi | |
| 2007/0060200 A1 | 3/2007 | Boris et al. | |
| 2007/0061268 A1 | 3/2007 | Herold et al. | |
| 2007/0083476 A1 | 4/2007 | Swartz et al. | |
| 2007/0091594 A1 | 4/2007 | Soon | |
| 2007/0106559 A1 * | 5/2007 | Harrell | G06Q 20/12 705/21 |
| 2007/0279002 A1 | 12/2007 | Partovi | |
| 2008/0147431 A1 | 6/2008 | Walneck et al. | |
| 2008/0157937 A1 * | 7/2008 | Cohen | G08C 17/02 340/309.16 |
| 2008/0183307 A1 | 7/2008 | Clayton et al. | |
| 2008/0207296 A1 * | 8/2008 | Lutnick | G07F 17/32 463/16 |
| 2008/0310337 A1 * | 12/2008 | Welles | H04L 12/2697 370/311 |

(56) References Cited

U.S. PATENT DOCUMENTS

| | | |
|---|---|---|
| 2008/0319908 A1 | 12/2008 | Venkatachalam et al. |
| 2009/0002333 A1* | 1/2009 | Maxwell .............. G06F 3/04883 345/173 |
| 2009/0013347 A1 | 1/2009 | Ahanger et al. |
| 2009/0024541 A1 | 1/2009 | Kremen |
| 2009/0096413 A1 | 4/2009 | Partovi et al. |
| 2009/0104874 A1 | 4/2009 | Ellis |
| 2009/0132805 A1* | 5/2009 | Ginter .................... G06F 21/10 713/150 |
| 2009/0183245 A1 | 7/2009 | Simpson et al. |
| 2009/0184679 A1 | 7/2009 | Yeh |
| 2009/0196016 A1 | 8/2009 | Massara et al. |
| 2009/0198603 A1 | 8/2009 | Simon et al. |
| 2009/0222320 A1 | 9/2009 | Arfin et al. |
| 2009/0234685 A1 | 9/2009 | Tarbell et al. |
| 2009/0234750 A1 | 9/2009 | Arfin |
| 2009/0251892 A1 | 10/2009 | Hatti et al. |
| 2009/0287543 A1 | 11/2009 | Allderdice et al. |
| 2009/0315485 A1 | 12/2009 | Verfuerth et al. |
| 2010/0026471 A1* | 2/2010 | Cohen .................... G08C 17/02 340/309.16 |
| 2010/0027785 A1 | 2/2010 | Haddock |
| 2010/0030838 A1 | 2/2010 | Atsmon et al. |
| 2010/0041470 A1* | 2/2010 | Preisach ................ G06Q 30/02 463/25 |
| 2010/0114679 A1 | 5/2010 | Pan |
| 2010/0141153 A1 | 6/2010 | Recker et al. |
| 2010/0174642 A1 | 7/2010 | Hornor |
| 2010/0179708 A1* | 7/2010 | Watson .................. G06Q 50/06 700/296 |
| 2010/0191575 A1 | 7/2010 | Raleigh |
| 2010/0243728 A1* | 9/2010 | Wiesman ............... G06Q 20/10 235/379 |
| 2010/0271802 A1 | 10/2010 | Recker et al. |
| 2010/0292961 A1 | 11/2010 | Moss |
| 2011/0004570 A1 | 1/2011 | Saad et al. |
| 2011/0015797 A1* | 1/2011 | Gilstrap ................. G05B 15/02 700/291 |
| 2011/0057518 A1 | 3/2011 | Gilbert |
| 2011/0058360 A1 | 3/2011 | Taiga |
| 2011/0086611 A1 | 4/2011 | Klein et al. |
| 2011/0106883 A1 | 5/2011 | Gupta et al. |
| 2011/0178926 A1 | 7/2011 | Lindelsee et al. |
| 2011/0270764 A1 | 11/2011 | Mizani Oskui |
| 2011/0288992 A1 | 11/2011 | Needham et al. |
| 2011/0295706 A1 | 12/2011 | Urquhart |
| 2012/0011007 A1 | 1/2012 | Blewett et al. |
| 2012/0026726 A1 | 2/2012 | Recker et al. |
| 2012/0043889 A1 | 2/2012 | Recker et al. |
| 2012/0080944 A1 | 4/2012 | Recker et al. |
| 2012/0112544 A1 | 5/2012 | Salcone |
| 2012/0197806 A1 | 8/2012 | Hill |
| 2012/0232714 A1 | 9/2012 | Ricket |
| 2012/0256585 A1 | 10/2012 | Partovi et al. |
| 2013/0013490 A1 | 1/2013 | Keller et al. |
| 2013/0132267 A1 | 5/2013 | Moore et al. |
| 2013/0185194 A1 | 7/2013 | Moore et al. |
| 2014/0054963 A1 | 2/2014 | Spitchka et al. |
| 2014/0067680 A1* | 3/2014 | Turner .................. G06Q 20/40 705/44 |
| 2014/0168985 A1 | 6/2014 | Chien |
| 2014/0324684 A1 | 10/2014 | Moore et al. |

FOREIGN PATENT DOCUMENTS

| | | |
|---|---|---|
| DE | 20 2011 102 340 U1 | 9/2011 |
| EP | 2 107 341 A1 | 10/2009 |
| EP | 2 224 162 A1 | 9/2010 |
| FR | 2901045 A1 | 11/2007 |
| GB | 2 315 145 A | 1/1998 |
| GB | 2 417 649 A | 3/2006 |
| GB | 2462089 A | 1/2010 |
| GB | 2 480 504 A | 11/2011 |
| GB | 2480504 A | 11/2011 |
| JP | 2004-220350 A | 8/2004 |
| JP | 2004-250982 A | 9/2004 |
| KR | 10-2007-0055106 A | 5/2007 |
| WO | WO 02/33669 A1 | 4/2002 |
| WO | WO 2004/049585 A1 | 6/2004 |
| WO | WO 2010/066865 A1 | 6/2010 |
| WO | WO 2011/144979 A1 | 5/2011 |
| WO | WO 2011/144979 A1 | 11/2011 |
| WO | WO 2011/149644 A2 | 12/2011 |

OTHER PUBLICATIONS

EE Times, "Sharp sees big picture for solar outdoor lighting," Aug. 23, 2004, located at <http://www.eetimes.com/document.asp?doc_id=1151024>, last accessed on Feb. 14, 2014.

Letham et al. (Oct. 1986) "A 128K EPROM Using Encryption of Pseudorandom Numbers to Enable Read Access" IEEE Journal of Solid-State Circuits, vol. SC-21, No. 5, pp. 881-888.

McLaughlin et al. (2010) "Energy theft in the Advanced Metering Infrastructure" LNCS 6027, pp. 176-187.

Tewari, D.D. et al., "An assessment of South African prepaid electricity experiment, lessons learned, and their policy implications for developing countries," *Energy Policy*, 2003, (31):911-27.

Bos, H.A. et al., "Implementing a Pre-Paid Electricity System in a Third World Environment," *Proceedings of the Africon Conference*, Ezulwini Valley, Swaziland, Sep. 22, 1992, pp. 409-412.

Supplementary European Search Report for European Patent Application No. 12715750.1, mailed Oct. 8, 2015, 3 pages.

* cited by examiner

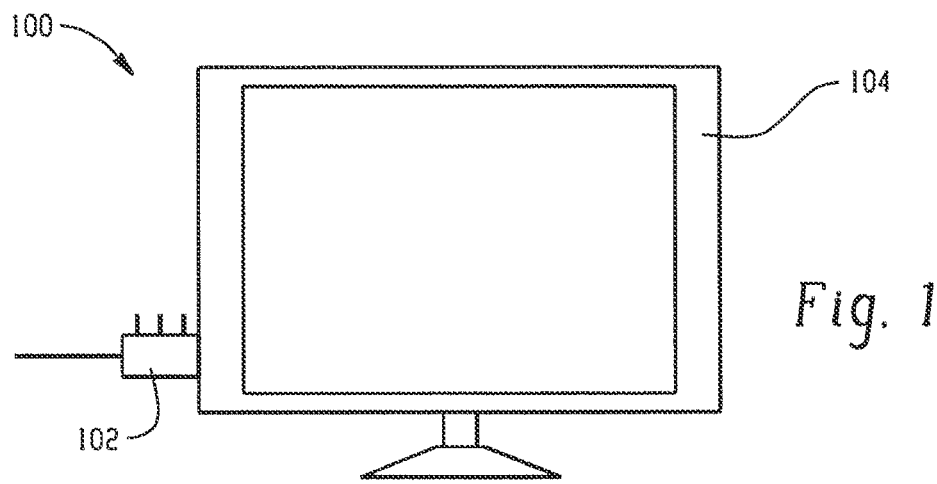
Fig. 1
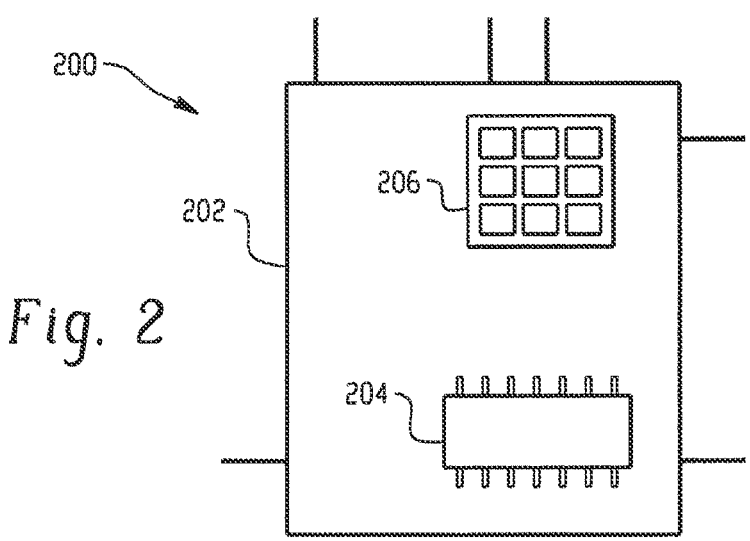
Fig. 2
```
AUTHORIZATION CODE
DEVICE SERIAL NUMBER        1284
US DOLLAR RECHARGE VALUE    $3.50
SERIES NUMBER                  3
CRYPTOGRAPHIC SIGNATURE    547732
FINAL CODE:      12840350 3547732
```
Fig. 3

| DATE | CREDIT REMAINING | STATUS | NOTES |
|---|---|---|---|
| JANUARY 1 | $12.00 | ENABLED | |
| JANUARY 2 | $8.00 | ENABLED | |
| JANUARY 3 | $8.00 | ENABLED | |
| JANUARY 4 | $5.00 | ENABLED | |
| JANUARY 5 | $3.00 | ENABLED | |
| JANUARY 6 | $0.00 | DISABLED | |
| JANUARY 7 | $0.00 | DISABLED | |
| JANUARY 8 | $0.00 | DISABLED | |
| JANUARY 9 | $10.00 | ENABLED | RECHARGED $10 |
| JANUARY 10 | $8.00 | ENABLED | |
| JANUARY 11 | $7.00 | ENABLED | |
| JANUARY 12 | $3.00 | ENABLED | |
| JANUARY 13 | $2.00 | ENABLED | |
| JANUARY 14 | $15.00 | ENABLED | RECHARGED $13 |
| JANUARY 15 | $12.00 | ENABLED | |
| JANUARY 16 | $10.00 | ENABLED | |
| JANUARY 17 | $8.00 | ENABLED | |
| JANUARY 18 | $5.00 | ENABLED | |
| JANUARY 19 | $1.00 | ENABLED | |
| JANUARY 20 | $0.00 | DISABLED | |
| JANUARY 21 | $0.00 | DISABLED | |
| JANUARY 22 | UNLOCKED | ENABLED | PURCHASED PERMANENT UNLOCK |
| JANUARY 23 | UNLOCKED | ENABLED | |

*Fig. 7*

SYSTEMS AND METHODS FOR ACTIVATION AND DEACTIVATION OF APPLIANCES

CROSS REFERENCE TO RELATED APPLICATIONS

The present application is a Continuation of U.S. application Ser. No. 13/741,218, filed Jan. 14, 2013 know issued as U.S. Pat. No. 9,020,852), which is a Continuation of U.S. application Ser. No. 13/042,611, filed Mar. 8, 2011 know issued as U.S. Pat. No. 8,355,805), the contents of which are expressly incorporated herein by reference in their entireties for all purposes.

TECHNICAL FIELD

The present disclosure relates generally to appliance control and more specifically to appliance usage restriction.

BACKGROUND

One in four people worldwide lack electricity. In many developing nations, centralized electrical production is not available and acquiring autonomous electrical production capabilities and appliances for utilizing produced electricity is cost prohibitive. The upfront costs of purchasing solar energy cells and related hardware as well as basic appliances such as lights, refrigerators, and fans is just too great for many people. Thus, a need exists for a system that enables persons on budgets to acquire electrical systems that may greatly improve health and duality of life while ensuring that providers of those systems are properly compensated.

SUMMARY

In accordance with the teachings provided herein, systems and methods are provided for an appliance system. The system may include an appliance and a processor connected to the appliance such that the processor places the appliance in an enabled state or a disabled state. The processor may be configured to track usage of the appliance and to place the appliance in a disabled state when the usage of the appliance exceeds a threshold amount. The system may also include a data receiving device configured to receive a code, wherein upon receipt of a valid. code, the processor is configured to adjust the threshold amount to allow additional usage of the appliance.

As another example, a method of operating an appliance may include determining a usage threshold amount and monitoring usage of the appliance. A code may be received using a. human interface device or a machine-to-machine communication device, the code being associated with a credit amount. A determination may be made that the received code is a valid code, and the usage threshold amount may be adjusted based on the credit amount associated with the valid code. The appliance may be disabled when the monitored usage exceeds the usage threshold amount.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 1 is a block diagram depicting an appliance usage monitoring system responsive to a television.

FIG. 2 is a block diagram depicting a charge controller that is part of a solar power generation system.

FIG. 3 depicts an example authorization code.

FIG. 7 depicts an example operational scenario.

DETAILED DESCRIPTION

Figure 4:
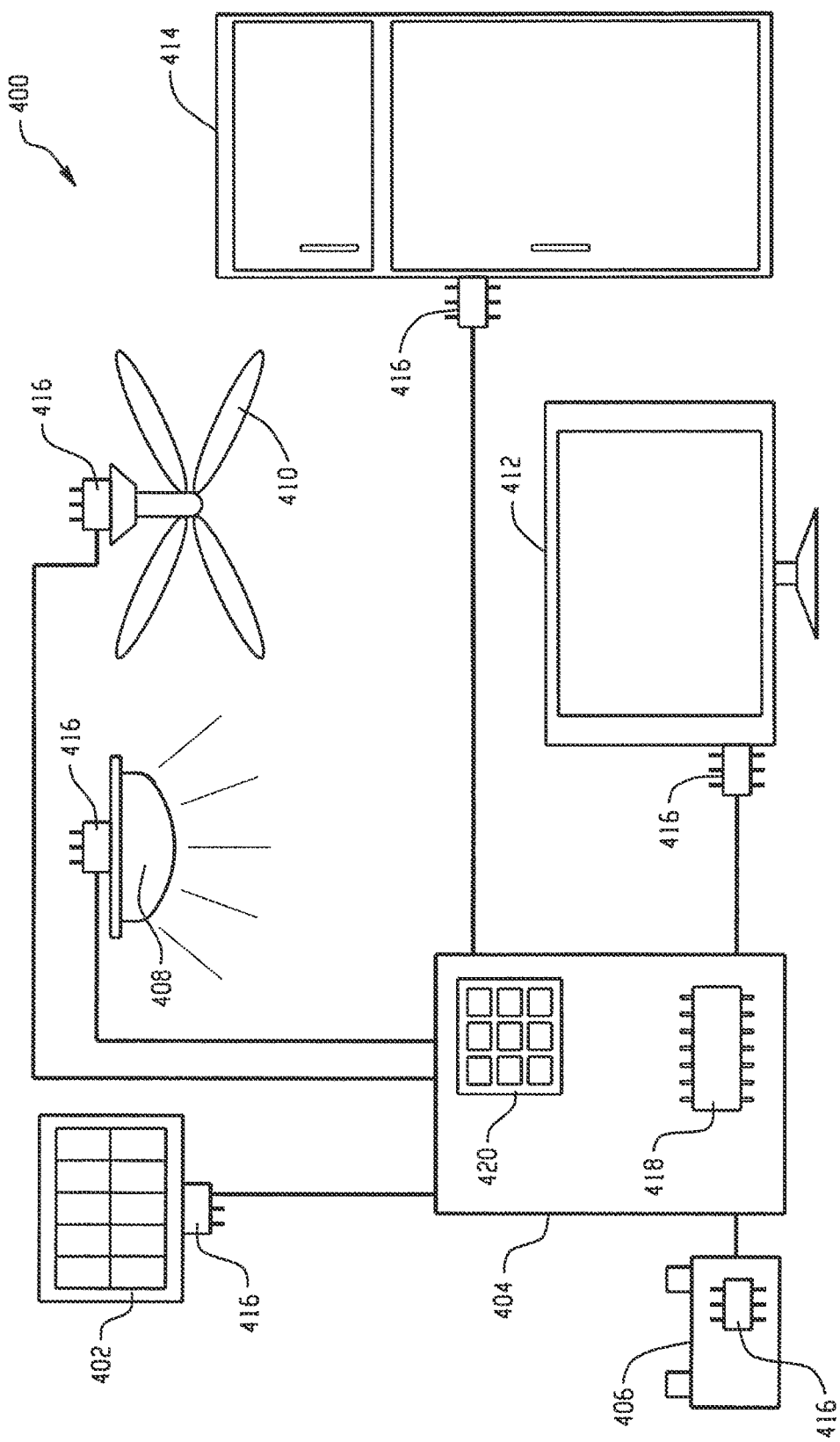
FIG. 4 depicts a network of appliances responsive to one or more appliance usage monitoring systems.

Electrical appliances as well as systems for autonomous production and storage of electricity are often cost prohibitive, excluding a large portion of the population from using those appliances. While many are unable to pay the large upfront costs involved with purchasing electrical appliances outright, those people may be able to pay for such appliances via an installment payment plan (e.g., a rent-to-own plan or a continuous rental plan). Appliance providers may have interests that run counter to appliance users at times in that the appliance providers desire to be paid in full for their goods. Appliance providers may prefer full payment of a purchase cost for an appliance upfront, thus guaranteeing payment. Installment plans may be less attractive to a provider, as the provider assumes certain risk that the appliance user will default on his payment plan. Appliance providers may be more willing to offer appliances via installment plans if the risk of non-payment is mitigated.

An appliance usage monitoring system may provide such mitigation by selectively enabling or disabling an appliance or collection of appliances based on the status of payments made by the user for the appliance and tracked usage of the appliances. When usage of the appliance exceeds a usage threshold that is set based on the current status of payments for the appliance, the appliance is disabled by the appliance usage monitoring system. The usage threshold may also be considered a balance of available usage (e.g., money credit) that is subtracted from, where usage threshold is exceeded and the appliance is disabled when usage fees exceed a current balance. The appliance may be re-activated when payments for the appliance become current. Because the appliance is non-functional when payments are not current, users are more likely to make timely payments. Appliance providers may be more ling to provide appliances via installment payment plans based on this knowledge, making the appliances available to a larger segment of the population. Appliances may take any number of forms and may include devices that provide electricity, devices that store electricity, devices that use electricity, or other devices that rely on chemical energy, mechanical energy, nuclear energy, or are otherwise powered that can be placed into an enabled or disabled state.

FIG. 1 is a block diagram depicting an appliance usage monitoring system responsive to a television. An appliance usage monitoring system 102. is connected to a television 104 and controls whether the television is in an enabled or disabled state. An appliance usage monitoring system 102 may be manifest in a variety of forms including a data processor or a microcontroller. Herein, an appliance usage monitoring system 102 is, at certain points, referred to generally as a processor. Example processors that may be used include a Microchip PIC24FJ64, an Atmel AT89C51, a Zilog Encore Z8F0130, a similar 8-bit, 16-bit, or 32-bit microcontroller, or others. A processor 102 may be attached to an appliance, such as a television 104, externally or may be integrated into the appliance. The processor 102 may include some type of tamper-resistance protection.

The processor tracks usage of the appliance and is configured to place the appliance in a disabled state when usage of the appliance exceeds a usage threshold amount. Usage may be tracked in a variety of different ways. For example, usage may be tracked by the passage of time. In such a case, an installment plan may grant a user one month of usage of an appliance for each payment made. In another example, usage may be tracked as an amount of time of active use. In such a case, an installment plan tray grant a user 20 hours of active use (e.g., television watching) for a $5.00 payment. In a further example, usage may be tracked as an amount of energy generated, stored, or used. In such a case, an installment plan may grant a user access to produce and use 1 kWh of energy using a solar powered energy generation/storage system for a $10.00 payment. Other metrics for appliance usage may also be utilized.

In addition to tracking usage of an appliance, an appliance usage monitoring system 102 tracks a usage threshold that determines how much the appliance may be used before the appliance is to be placed into a disabled state. The usage threshold may be set according to terms of an installment payment plan between an appliance provider and a user. The usage threshold may be adjustable based on receipt of confirmation of payment to the application provider. For example, a user may agree to an installment payment plan for a television, where the user is permitted to use the television for $5.00 per month. The user pays $5.00 at the time of agreement and the usage threshold is set to one month from the time of the agreement. When the appliance usage monitoring system 102 determines that the month has expired, and no additional payment confirmations have been received, the appliance usage monitoring system 102 may place the television in a disabled state. Upon receipt of a payment confirmation, the appliance usage monitoring system 102 may adjust the usage threshold to one month from the receipt of payment confirmation. If a payment confirmation for one month of usage is received by the appliance usage monitoring system while the television is still in an enabled state, then the appliance usage monitoring system may extend the usage threshold one month from the current usage threshold.

Some appliance usage monitoring systems 102 may also support an installment plan pay-off feature. A user may decide to pay off the remaining balance of his installment plan instead of continuing to make installment payments. A special payment confirmation may be provided to the appliance usage monitoring system 102 associated with the now-paid-off appliance indicating that the appliance has been paid for in full. Upon receipt of such a message, the associated appliance usage monitoring system may allow continual use of the appliance without placing the appliance in a disabled state. This may be accomplished in a variety of ways including extending the usage threshold to infinity or beyond the useful life of the appliance, discontinuing monitoring of usage of the appliance, setting a flag instructing the system 102 not to place the appliance in a disabled state when usage exceeds the usage threshold, or other mechanisms.

The appliance usage monitoring system 102 may place an appliance in a disabled state in a variety of ways. For example, an appliance usage monitoring system 102 may disconnect an appliance, such as a television 104, from a power source, such that the appliance is completely disabled. The appliance usage monitoring system 102 may completely disabled an appliance via a number of other mechanisms as well. The appliance usage monitoring system 102 may disable appliance by placing the appliance in a state of diminished usefulness. Such a disabling may allow some limited use of the appliance. For example, a disabled television may be limited to display of a single channel or a subset of channels that are available when the television is in an enabled state (e.g., only a channel displaying a message prompting the user to buy more credit is viewable). A light appliance may be limited to only a lowest brightness setting. A fan appliance may be limited to a lowest speed setting. An amount of power generated, stored, or made available for use from a solar energy system may be limited (e.g., to 25% of enabled state) when the system is placed in a disabled state by an appliance usage monitoring system.

The appliance usage monitoring system 102 may be used in a variety of contexts. For example, the appliance usage monitoring system 102 may be incorporated into an autonomous solar power system that can operate without needing a connection to any electrical grid (e.g., a system may be used tote locations having no connection to a centralized power provider). The system may include a solar panel, a wind turbine, or other energy capture device. A charge controller may control transfer of that captured energy to one or more batteries. Power from the one or more batteries may be supplied to one or more appliances via DC power or AC power via an inverter.

The appliance usage monitoring system may receive payment confirmation in a variety of ways. FIG. 2 is a block diagram depicting a charge controller that is part of a solar power generation system. The charge controller 202 includes a processor 204 connected to the charge controller 202 such that the processor 204 places the charge controller 202 in an enabled state or a disabled state. The processor 204 tracks usage of the charge controller 202 and places the charge controller 202 in a disabled state when usage of the charge controller 202 exceeds a threshold amount (e.g., the charge controller 202 provides more than a threshold amount of energy to a battery for storage).

The charge controller 202 also includes a human interface device 206 for data entry. The data entry device 206 is configured to receive a code. When a valid code is received via the data entry device 206, the processor 204 is configured to adjust the threshold amount to allow additional usage of the appliance. Data entry devices may take a variety of forms. In the example of FIG. 2, the data entry device 206 is a keypad. Upon making an installment payment, a user may be provided a code. A user may type a code into the data entry device 206. The data entry device 206 or the processor 204 may verify the authenticity of the code in one of a variety of ways, as described further herein below. Upon verification of the authenticity of the code, the threshold amount is adjusted. For example, when a user types a valid code using the data entry device 206, the processor 204 may extend the threshold amount such that the charge controller may be used in an active state for a longer period of time or may be made active for providing a further amount of energy to a battery for storage.

The code may be entered via a number of other mechanisms as well. A single button may be used, where the code can be entered in a Morse-code fashion. Multiple buttons could be arranged in series or in a keypad grid. A microphone could be used for receiving audible tones that convey the code (e.g., a mobile phone could be held close to the microphone, and tones representing a code could be played from the phone to the microphone). A barcode scanner could read an optical code printed on paper or displayed on a screen. Codes may also be entered wirelessly via an RFID scanning system (e.g., the system could include an RFID reader, where an RFID chip containing a code is placed close to the reader for transmission of the code) or an infrared receiver.

Some or all of the code may also be sent directly to the device without user intervention via a wireless communication protocol such as 802.11 (Wi-Fi), GSM (Global System For Communications), SMS (Short Message Service), GPRS (General Packet Radio Service), EDGE (Enhanced Data Rates for GSM Evolution), 3G (international Mobile Telecommunications-2000), WiMAX (Worldwide Interoperability for Microwave Access), or 4G (International Mobile Telecommunications Advanced).

Codes for extending threshold amounts or for unlocking appliances for unlimited use may take a variety of forms. Codes may be unsecured or may be encrypted or otherwise secured to confirm authenticity, prevent reuse, and otherwise ensure protection of an appliance provider's investment by preventing misuse of the system. FIG. 3 depicts an example authorization code. The final code is a concatenation of a number of values that are interpreted by the system, such as via a processor, to determine authenticity of the code and actions that should be taken by the system in response to receipt of a valid code (e.g., extending a usage threshold). The final code depicted in FIG. 3 is a concatenation of a device serial number, an amount of credit that was purchased by a user, a series number, and a cryptographic signature. The device serial number may be included with each code to ensure that the code is used with the system for which payment was made. The system may refuse to adjust a threshold amount when the device serial number identified in the code does not match a device serial number of the appliance. The credit amount identifies an amount by which a threshold amount should be adjusted based on a received payment. All payments may move the threshold amount a uniform amount, or larger payments may move the threshold amount larger amounts than smaller payments. A credit amount may indicate that the appliance has been paid for in full, unlocking the appliance. Receipt of a certain number of payments or certain cumulative credit amounts may also unlock the appliance (e.g., the appliance may be unlocked upon receipt of a code for a final installment payment).

A series number may be included to prevent reentry of a code (e.g., the system may only accept one code for each series number). Additionally, the code may include a cryptographic signature. The cryptographic signature may be generated in a variety of ways, such as via the public key infrastructure (PKI) (e.g., the cryptographic signature may be a digital signature created using a private key where the system verifies the authorship of the code using a public (e.g., RSA) key), or via a shared secret key using cryptographic algorithms such as AES, SHA1, or SHA256, or SHA512 to generate the signature. Such a key may authenticate the author and verify that the message has not been tampered with, such as via an error-checking value. The signature may be entered at the same time as the rest of the code, or the processor may request the signature separately via a wireless communication protocol.

An appliance usage monitoring system may be responsive to a single appliance or may function with a network of appliances. FIG. 4 depicts a network of appliances responsive to one or more appliance usage monitoring systems. The network includes a solar panel 402, a charge controller 404, a battery 406, a light 408, a fan 410, a television 412, and a refrigerator 414. Each of the depicted appliances may include an autonomous appliance usage monitoring system, such as in the processors depicted at 416. Autonomous appliance usage monitoring systems 416 may individually monitor usage of associated appliances, accept codes for those appliances, and place the associated appliances in enabled or disabled states.

In other implementations, an appliance usage monitoring system may be centralized, having one master processor (e.g., the processor 418 connected to the charge controller 404) and several slave processors 416. Codes for each of the appliances or the network as a whole may be received via the data entry device 420 connected to the charge controller 404. In some implementations, installment payments may be made for the entire network of appliances. In those cases, when usage of the appliances exceeds the usage threshold, the master processor 418 may send signals to the slave processors 416 instructing the slave processors 416 to place the appliances into a disabled state. In another implementation, the master processor may coordinate installment payments fir each of the appliances in the network individually. In those cases, usage for each of the appliances may be tracked, and the master processor may instruct that individual appliances be placed into a disabled state by their associated processor 416 when usage of those appliances exceeds the usage threshold. The usage threshold for each appliance may be extended individually through receipt of valid payment codes associated with those appliances.

Figure 5:
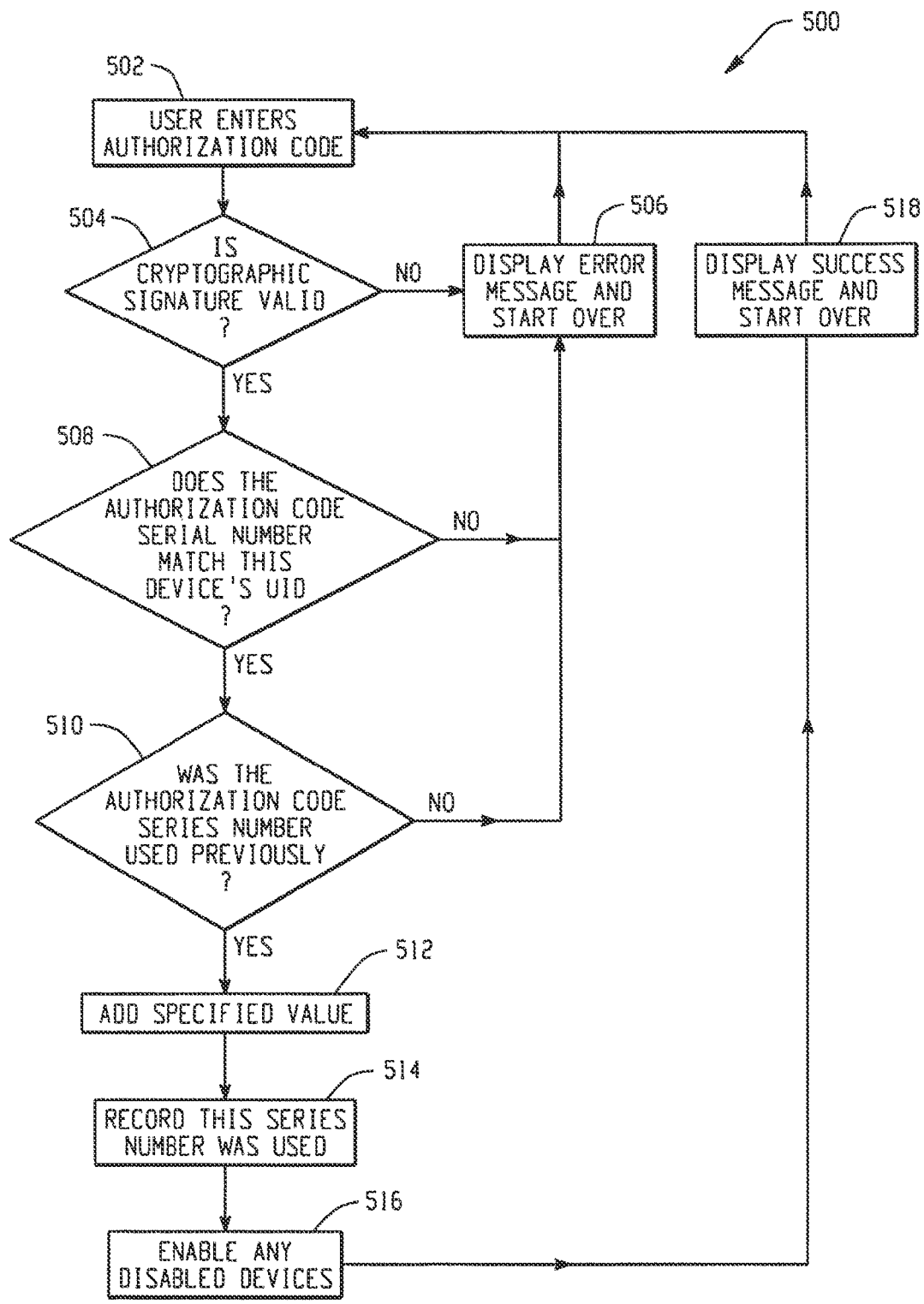
FIG. 5 is a flow diagram depicting an example code verification operation.

FIG. 5 is a flow diagram depicting an example code verification operation. At 502, a user enters an authorization code, for example, through a human interface device, or the code may be received without user intervention through machine-to-machine communication. At 504, the system determines whether the cryptographic signature included with the authorization code is valid. If the signature is not valid, then an error message is displayed 506, and the code is rejected. At 508, the system determines whether the serial number included with the authorization code matches an identifier associated with the appliance. If the serial number does not match, then an error message is displayed 506, and the code is rejected. At 510, the system determines whether the authorization code was previously used, such as via a series number value. If the code has already been entered, then an error message is displayed 506, and the code is rejected. At 512, a specified value (e.g., an amount corresponding to the payment amount identified the authorization code) is added to the usage threshold. At 514, the series number of the authorization code is recorded to prevent reentry of an authorization code. If the appliance is in a disabled state, then the appliance is enabled at 516, and a success message is displayed at 518.

Figure 6:
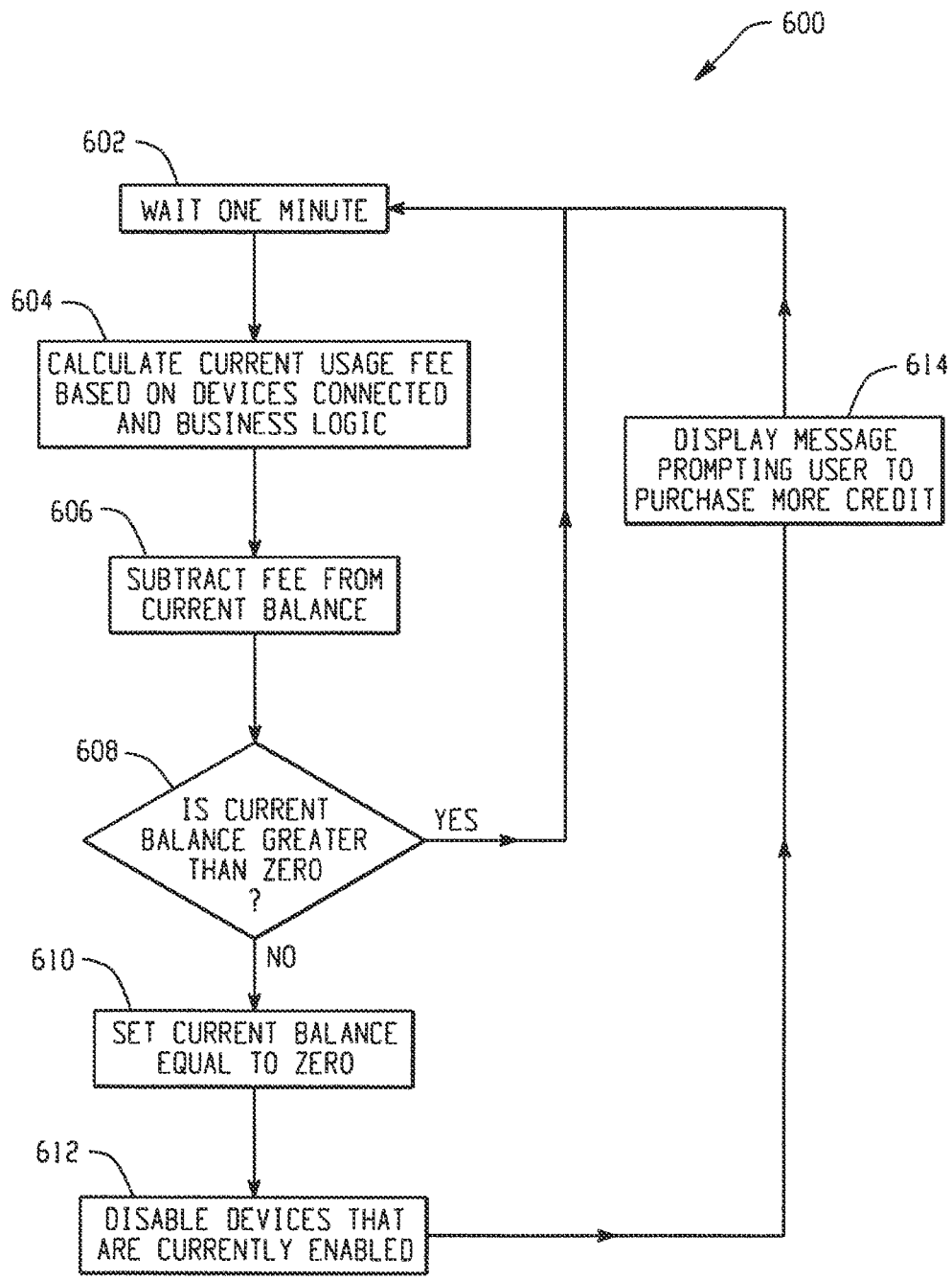
FIG. 6 is a flow diagram depicting example monitoring of usage of an appliance.

FIG. 6 is a flow diagram depicting example monitoring of usage of an appliance. A delay is performed at 602, and a usage of one or more appliances during the delay is analyzed at 604. in the example of FIG. 6, a fee is calculated based on the detected usage (e.g., 1 minute of television watching is calculated as a $0.01 usage fee). At 606, the usage fee calculated at 604 is subtracted from a balance (e.g., an amount of credit held on the device as identified by entered. authorization codes). At 608, a determination is made as to whether the balance is greater than zero. If the balance is greater than zero, then credit remains and the process returns to the delay stage 602. If the balance is less than zero, then the balance is set equal to zero at 610, and the device(s) is disabled at 612. A message may be displayed prompting the user to purchase more credit at 614.

FIG. 7 depicts an example operational scenario. On January 1, the appliance is enabled with $12.00 of credit remaining. Usage during the period from January 1 to January 5 reduces the credit. On January 6, the credit remaining reaches $0.00 and the appliance is placed into a disabled state. On January 9, the appliance is re-enabled with a credit of $10.00, such as via entry of a valid code. From January 9 to January 13, usage of the appliance reduces the credit to $2.00. On January 14, the appliance is further recharged by $13.00. The $13,00 credit is added to the remaining $2.00 credit, resulting in $15.00 of total credit. Usage from January 14 to January 20 reduces the credit to $0.00, whereupon the appliance is placed into a disabled state. On January 22, a code is entered stating that the appliance has been fully paid for and is to be permanently unlocked. As indicated, on and after January 22 credits and usage may not be further tracked after permanent unlock.

Figure 8:
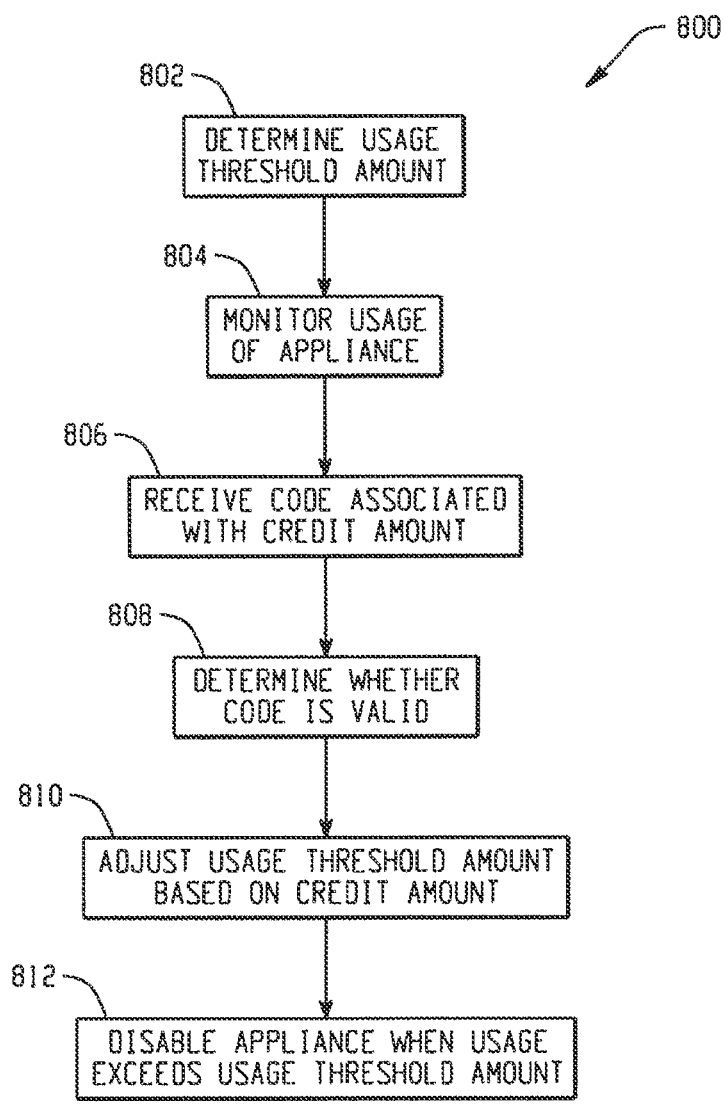
FIG. 8 is a flow diagram depicting a method of operating an appliance.

FIG. 8 is a flow diagram depicting a method of operating an appliance. At 802, a usage threshold amount is determined, and usage of the appliance is monitored at 804. A code may be received at 806 using a human interface device or machine-to-machine communication device, the code being associated with a credit amount. At 808, a determination may be made that the received code is a valid code, and the usage threshold amount may be adjusted at 810 based on the credit amount associated with the valid code. The appliance may be disabled at 812 when the monitored usage exceeds the usage threshold amount.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

It is claimed:

1. A method of configuring an electrical device for use, the method comprising:
   in response to receipt of a deposit, providing a user with possession of the electrical device, the deposit being less than a capital cost of the electrical device;
   by a transaction processing system that is remote from the electrical device, charging an amount for a determined amount of time in which the electrical device is usable, wherein the amount charged includes a portion allocated to the capital cost of the electrical device;
   receiving a funds transfer for payment of the amount charged, wherein the funds transfer is received by the transaction processing system remotely from the electrical device;
   in response to successful processing of a payment for the amount charged by the transaction processing system, configuring the electrical device so that the electrical device is usable for the determined amount of time, and if processing of the payment is not successful or if the electrical device has been used for the determined amount of time, configuring the electrical device so that the electrical device is not usable, wherein
      said configuring the electrical device so that the electrical device is usable includes sending a first form of electronic message to the electrical device from a remote location which causes a processor associated with the electrical device to activate the electrical device so that the electrical device is usable for the determined amount of time,
      said configuring the electrical device so that the electrical device is not usable includes deactivating the electrical device so that the electrical device is not usable, and
      repeating the steps of charging an amount for a determined amount of time, receiving a funds transfer for payment of the amount charged, and configuring the electrical device so that the electrical device is usable, until the capital cost of the electrical device has been paid; and
   after successful processing of payments such that the capital cost of the electrical device has been paid, by the transaction processing system, configuring the electrical device by sending a second form of electronic message to the electrical device from a remote location which causes the processor in the electrical device to enable the electrical device to remain usable without further charges for the capital cost.

2. The method according to claim 1, wherein the transaction processing system configures the electrical device by wirelessly sending the first form of electronic message to the electrical device so that the electrical device is useable for the determined amount of time.

3. The method according to claim 1, further comprising configuring the electrical device by wirelessly sending the second form of electronic message to the electrical device so that the electrical device remains usable without further charges once the capital cost of the electrical device is paid off.

4. The method according to claim 1, further comprising configuring the electrical device by wirelessly sending the first form of electronic message to the electrical device so that the electrical device is usable for the determined amount of use time independent of whether the electrical device is connected to a mains electrical supply.

5. The method according to claim 4, wherein the electrical device is powered by a renewable energy source that is independent of a mains electrical supply.

6. The method according to claim 1, wherein the electrical device has an operational state that is one of a functional state or a non-functional state, and wherein the electrical device is usable during a time in which the electrical device is in the functional state.

7. The method according to claim 1, further comprising monitoring use of the electrical device and collecting usage information pertaining to use of the electrical device.

8. The method according to claim 7, further comprising calculating an amount of carbon offset based on the usage information.

9. The method according to claim 1, further comprising monitoring a timer that measures time of use of the electrical device and configuring the electrical device so that the electrical device is no longer usable when the determined amount of time has elapsed.

10. The method according to claim 1, wherein the processor disconnects the electrical device from a power source when the electrical device is deactivated.

11. The method according to claim 1, wherein the processor is configured to extend the determined amount of time during which the electrical device is to be usable when a valid code is received.

12. The method according to claim 1, wherein the processor is a Microchip PIC24FJ64, an Atmel AT89C51, a Zilog Encore Z8F0130, an Intel Core 2, an Intel Core i3, an Intel Core i5, an Intel Core i7, an AMD Athlon II, or an AMD Phenom II.

13. The method according to claim 1, wherein the processor is a microcontroller or a microprocessor.

14. The method according to claim 1, wherein the first form of electronic message is authenticated using an AES, SHA1, SHA256, or SHA512 cryptographic function.

15. The method according to claim 1, wherein the electrical device is a solar panel.

16. The method according to claim 1, wherein the electrical device includes a data receiving device for receiving the first from and the second form of electronic message, wherein the data receiving device is a keypad, a button, a tone recognition device, a barcode scanner, an infrared receiver, or an RFID reader.

17. The method according to claim 1, wherein the electrical device includes a data receiving device for receiving the first form and the second form of electronic message, wherein the data receiving device is a machine-to-machine communication device using the 802.11 Wi-Fi communication protocol, GSM (Global System For Communications), SMS (Short Message Service), GPRS (General Packet Radio Service), EDGE (Enhanced Data Rates for GSM Evolution), 3G (International Mobile Telecommunications-2000), WiMAX (Worldwide Interoperability for Microwave Access), or 4G (International Mobile Telecommunications Advanced).

18. The method according to claim 1, wherein when the electrical device is configured to be unusable, the electrical device is placed in a state of limited utility, and wherein the state of limited utility disables at least one feature of the electrical device that is available when the electrical device is deemed usable.

19. The method according to claim 1, wherein configuring the electrical device to be unusable prevents the electrical device from operating in a full operational mode.

20. The method according to claim 1, wherein configuring the electrical device to be unusable: prevents running a fan on other than a lowest level, prevents a television from being changed from a particular channel, or prevents a light from being changed from a low level setting.

21. The method according to claim 1, wherein the electrical device is an apparatus.

22. The method according to claim 21, wherein the apparatus is a fan, a television, a light, or a solar panel.

* * * * *